United States Patent
Drucker et al.

(10) Patent No.: US 6,243,414 B1
(45) Date of Patent: Jun. 5, 2001

(54) METHOD AND APPARATUS FOR DATA TRANSMISSION USING DISCRETE MULTITONE TECHNOLOGY

(75) Inventors: Vitaly Drucker, Stamford; Yuri Goldstein, Southbury; William Hanna, Wolcott; Yuri Okunev, Southbury, all of CT (US)

(73) Assignee: PCTEL, Inc., Milpitas, CA (US)

(*) Notice: Subject to any disclaimer, the term of this patent is extended or adjusted under 35 U.S.C. 154(b) by 0 days.

(21) Appl. No.: 09/360,252

(22) Filed: Jul. 23, 1999

(51) Int. Cl.[7] .............................. H04B 1/38; H04L 5/16; H04L 27/28; H04K 1/10
(52) U.S. Cl. ............................................ 375/222; 375/260
(58) Field of Search ...................................... 375/219, 220, 375/222, 227, 259, 260, 295, 296, 316, 347, 346, 377; 370/203, 204, 206, 210, 484, 494; 379/93.01, 93.08, 93.26, 93.28

(56) References Cited

U.S. PATENT DOCUMENTS 5,400,322 * 3/1995 Hunt et al. ............................ 370/468
5,519,731 * 5/1996 Cioffi .................................... 375/260

OTHER PUBLICATIONS

Article entitled "An Efficient Bit–Loading Algorithm For DMT Applications" by Sonalker and Shively, Sep. 1998 IEEE publication, 6 pages.

ITU Telecommunications Standardization Sector, Recommendation G.992.2 , Study Group 15, Section 11.12.14 and Section 11.11.13, Mar. 1999.

ITU Telecommunications Standardization Sector, Recommendation G.992.1 , Study Group 15, Section 10.8.13 and Section 10.9.14, Mar. 1999.

* cited by examiner

Primary Examiner—Stephen Chin
Assistant Examiner—Betsy L. Deppe
(74) Attorney, Agent, or Firm—David P. Gordon; David S. Jacobson; Thomas A. Gallagher

(57) ABSTRACT

A method of providing a high bit rate DMT signal includes providing information on a plurality of DMT tones, with at least two of the plurality of DMT tones sending information in parallel. Of the tones sending information in parallel, at least one has a SNR too low to be individually used for the number of bits it is transmitting. Accordingly, the tones are coherently "combined" at the receiver in order to generate a SNR sufficient together to carry, at the desired BER, the number of bits being transmitted in parallel. Two or more tones which alone cannot carry a single bit of information may be used together to provide a sufficient SNR at the receiver to transmit one or more bits. Similarly, two or more tones which alone cannot carry two bits of information, may be used together via parallel transmission to provide a sufficient SNR at the receiver. Further, the bit-carrying capacity of a first tone which can carry one or more bits may be increased by transmitting an increased number of bits in parallel with one or more additional tones which cannot carry any bits of information. According to another embodiment of the invention, rather than sending two or more DMT tones in parallel, one or more DMT tones are repeated over a plurality of DMT symbols, and "combined" coherently in order to generate a SNR sufficient together to carry the number of bits being carried by the repeated tone.

37 Claims, 2 Drawing Sheets

| TONE N BRM #1 | 1 0 | 2 0 | 3 0 | 4 0 | 5 0 | 6 0 | 7+ 0 | 8+ 10001 | 9++ 0 | 10++ 10001 | 11++ 10010 | 12 0 |
|---|---|---|---|---|---|---|---|---|---|---|---|---|
| TONE N BRM #1 | 1 0 | 2 0 | 3 0 | 4+ 0 | 5 0 | 6 0 | 7+ 10011 | 8++ 0 | 9++ 10001 | 10 0 | 11++ 10011 | 12++ 10100 |
| TONE N BRM #2 | 1 0000 | 2 0000 | 3 0000 | 4+ 0000 | 5 0000 | 6 0000 | 7+ 0011 | 8++ 0000 | 9++ 0001 | 10 0000 | 11++ 0011 | 12++ 0100 |
| TONE N BRM #3 | 1 0 | 2 0 | 3 0 | 4 0 | 5 0 | 6 0 | 7+ 0 | 8+ 1 | 9++ 0 | 10++ 1 | 11++ 1 | 12 0 |

FIG.3a

| SYM 1 TONE N BRM | 1 0 | 2 0 | 3 0 | 4 0 | 5 0 | 6 0 | 7 1 | 8 1 | 9 1 | 10 1 | 11 1 | 12 1 |
|---|---|---|---|---|---|---|---|---|---|---|---|---|
| SYM 2 TONE N BRM | 1 0 | 2 0 | 3 0 | 4 0 | 5 0 | 6 0 | 7 0 | 8 0 | 9 0 | 10 0 | 11 1 | 12 1 |
| SYM 3 TONE N BRM | 1 0 | 2 0 | 3 0 | 4 0 | 5 0 | 6 0 | 7+ 1 | 8 1 | 9 1 | 10 1 | 11 0 | 12 0 |

FIG.3b

METHOD AND APPARATUS FOR DATA TRANSMISSION USING DISCRETE MULTITONE TECHNOLOGY

BACKGROUND OF THE INVENTION

1. Field of the Invention

The present invention relates to telecommunications. More particularly, the present invention relates to the transmission of data utilizing discrete multitone technology (DMT). The present invention is advantageously utilized in digital subscriber line (DSL) technology, although it is not limited thereto.

2. State of the Art

Recently, digital subscriber line (DSL) technology has been touted as the answer for the ever-increasing demand for transfer of information, and the requirement for higher and higher information transfer rates. DSL modems provide a much higher data rate than the convention V.34 and V.90-type modems. The DSL modems utilize discrete multitone (DMT) technology to transfer information. In DMT technology, a plurality of predefined frequencies (tones) are simultaneously subjected to quadrature amplitude modulation (QAM) in order to transfer information across a channel. In recently promulgated standards such as G.Lite and G.dmt standards (Recommendations G.992.1 and G.992.2 ITU-Telecommunication Standardization Sector, Study Group 15, MA-007 and MA-008, Melbourne Australia Mar. 29–Apr. 2, 1999) both of which are hereby incorporated by reference herein in their entireties, one hundred twenty-eight and two hundred fifty-six tones are specified respectively, with an integer number of bits of up to fifteen being transferred per tone. The actual tones utilized depends upon the signal-to-noise ratio (SNR) distribution of the channel. In particular, during a handshake sequence, the channel is scanned, and the SNR distribution and/or other parameters are measured.

The actual bit rate provided by a DMT-based system actually depends on the signal-to-noise ratio (SNR) distribution at the input of a receiver. The higher SNR per tone, the more bits the tone can carry (transfer). In turn, the SNR distribution is a function of signal attenuation and the noise power spectral density (PSD). It is well known that the signal attenuation is often a non-monotonic function of frequency, with one or more deep notches located along the frequency spectrum. In addition, PSD is not a flat function of frequency. As a result, the SNR is generally a multiextreme function of frequency.

An example of the SNR distribution for a 16 kft subscriber line is shown in Table 1. In this example, the first five tones would not be used as they would interfere with the "plain old telephone service" (POTS). The sixth tone has a SNR=29.51 dB. If the desired bit error rate (BER) is set equal to $10^{-7}$, the sixth tone can carry six bits, as a SNR=27 dB is required for transmission of six bits, while a SNR=30 dB is required for transmission of seven bits. The seventeenth tone, on the other hand, having a SNR=10.46 dB cannot even transmit a single bit, because a SNR of at least 11 dB is required to transmit one bit when the BER=$10^{-7}$.

Some SNR adjustment is possible in DMT-based systems. For example, the transmitted level of the sixth tone in Table 1 may be increased by 0.49 dB to allow the tone to bear seven bits, with the transmitted level of the seventeenth tone may be increased by 0.54 dB to allow the tone to carry one bit. Thus, according to Section 11.12.14 and Section 11.11.13 of the G992.2 standard, and Sections 10.8.13 and 10.9.14 of the G992.1 standard, during initialization, the transmitting modem is provided information by the receiving modem regarding the number of bits to be sent (B) and the gain (G) for each tone being transmitted. However, the permissible signal gain is usually restricted. According to the previously incorporated G.lite standard, the maximum gain for any one tone is set equal to 2.5 dB. As a result, with a BER=$10^{-7}$, no tone having a SNR<8.5 dB can be used for data transmission. Using this criteria, it will be appreciated that in the case corresponding to Table 1, all tones with numbers 20 to 75 and 107 to 128 (as shown in bold type) cannot be used for data transmission. As a result, the actual bit rate is significantly reduced.

SUMMARY OF THE INVENTION

It is therefore an object of the invention to provide methods, apparatus, and systems for transmitting data utilizing DMT technology.

It is another object of the invention to provide methods, systems, and apparatus for increasing the bit rate in DMT-based systems by utilizing low-SNR tones which would otherwise not be utilized in existing systems.

It is a further object of the invention to provide methods, systems, and apparatus for providing a high bit rate DMT signal by transmitting information on low-SNR tones in parallel with either other low-SNR tones or with higher SNR tones, and coherently combining such tones at the receiver.

It is an additional object of the invention to provide methods, systems, and apparatus for transmitting initialization signals within existing standards which identify the combination of low-SNR tones with other tones.

In accord with the objects of the invention, a method of providing a high bit rate DMT signal includes providing information on a plurality of DMT tones, with at least two of the plurality of DMT tones sending information in parallel (i.e., the tones are taken from a single DMT symbol). Of the two tones sending information in parallel, at least one of those tones has a SNR too low to be individually used for the number of bits it is transmitting. According to the method of the invention, the tones are coherently "combined" at the receiver in order to generate a SNR sufficient to carry, at the desired BER, the number of bits being transmitted in parallel. Thus, two or more tones which alone cannot carry a single bit of information may be used together via parallel transmission to provide a sufficient SNR at the receiver at the desired BER to transmit one or more bits. Similarly, two or more tones which alone cannot carry two bits of information (the minimum requirement of certain standards) may be used together via parallel transmission to provide a sufficient SNR at the receiver at the desired BER to transmit two or more bits. Further, the bit-carrying capacity of a first tone which can carry one or more bits may be increased by transmitting an increased number of bits in parallel with one or more additional tones which cannot carry any bits of information. Further yet, the energy margin of an active tone carrying one or more bits may be increased by transmitting the same number of bits in parallel with one or more additional tones which alone cannot carry a single bit of information.

According to another embodiment of the invention, rather than sending two or more DMT tones in parallel, one or more DMT tones are repeated over a plurality of DMT symbols, and "combined" coherently in order to generate a SNR sufficient to carry, at the desired BER, the number of bits being carried by the repeated tone. As with the embodiment which sent tones in parallel in a single symbol (also called the "frequency-diversity" technique), the repeated tone arrangement (also called the "time-diversity" technique) permits a single tone which alone cannot carry a single bit of information to provide a sufficient SNR at the receiver at the desired BER to transmit one or more bits. Similarly, a tone which alone cannot carry two bits of information may be repeated over two or more symbols to provide a sufficient SNR at the receiver at the desired BER to transmit two or more bits. It should be appreciated that the time-diversity technique has certain advantages and disadvantages relative to the frequency-diversity technique. In particular, a disadvantage is that it introduces an at least one-symbol delay into the signal processing. An advantage is that for several consecutive symbols, the SNR ratio for any particular tone will be close to each other, and consequently the aggregate SNR increases quickly.

According to one embodiment of the invention, the time-diversity technique can be combined with the frequency-diversity technique to increase the bit rate of the system. It will be appreciated that various techniques can be utilized to optimize the data rate by carefully choosing which tones are to be utilized in the frequency-diversity and/or time-diversity techniques.

In accord with another aspect of the invention, the signaling required for sending DMT tones according to the frequency-diversity technique or according to the time-diversity technique is implemented by increasing the length of the bit and gain (B&G) initialization message (which, for example, is defined in Sections 11.12.14 and 11.11.13 of the G992.2 standard). According to the preferred embodiments of the invention, in the frequency-diversity technique, the extra bits provided to the B&G sequence are utilized algorithmically for signaling which tones are being sent in parallel. In the time-diversity technique, a single extra bit is used for each tone as a flag to indicate whether it is being used in conjunction with the same tone in a next symbol. Regardless, in the receiver, a tone combination unit is utilized to combine the tones (based on what was signaled).

Additional objects and advantages of the invention will become apparent to those skilled in the art upon reference to the detailed description taken in conjunction with the provided figures.

BRIEF DESCRIPTION OF THE DRAWINGS

FIG. 3a is a chart showing four different bit repetition message schemes relating to frequency-diversity signaling.

FIG. 3b is a chart showing a bit repetition message scheme relating to time-diversity signaling.

DETAILED DESCRIPTION OF THE PREFERRED EMBODIMENTS

Figure 1:
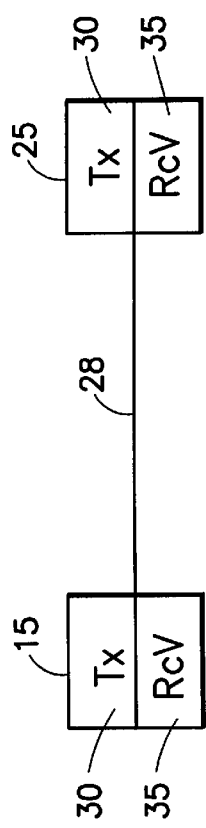
FIG. 1 is a high level block diagram of the system of the invention.

As seen in FIG. 1, the system of the invention includes two modems 15, 25 which use discrete multitone technology, and a transmission channel 28. The system will be described hereinafter with respect to DSL data transmission services, although it is not limited thereto. The modems 15, 25 each include a transmitter 30 and a receiver 35 which transmit and receive data pursuant to various telecommunications standards such as previously incorporated G.992 and G.992.1. The transmission channel is typically a twisted-pair type channel within a customer service area, although it is not limited thereto.

Figure 2:
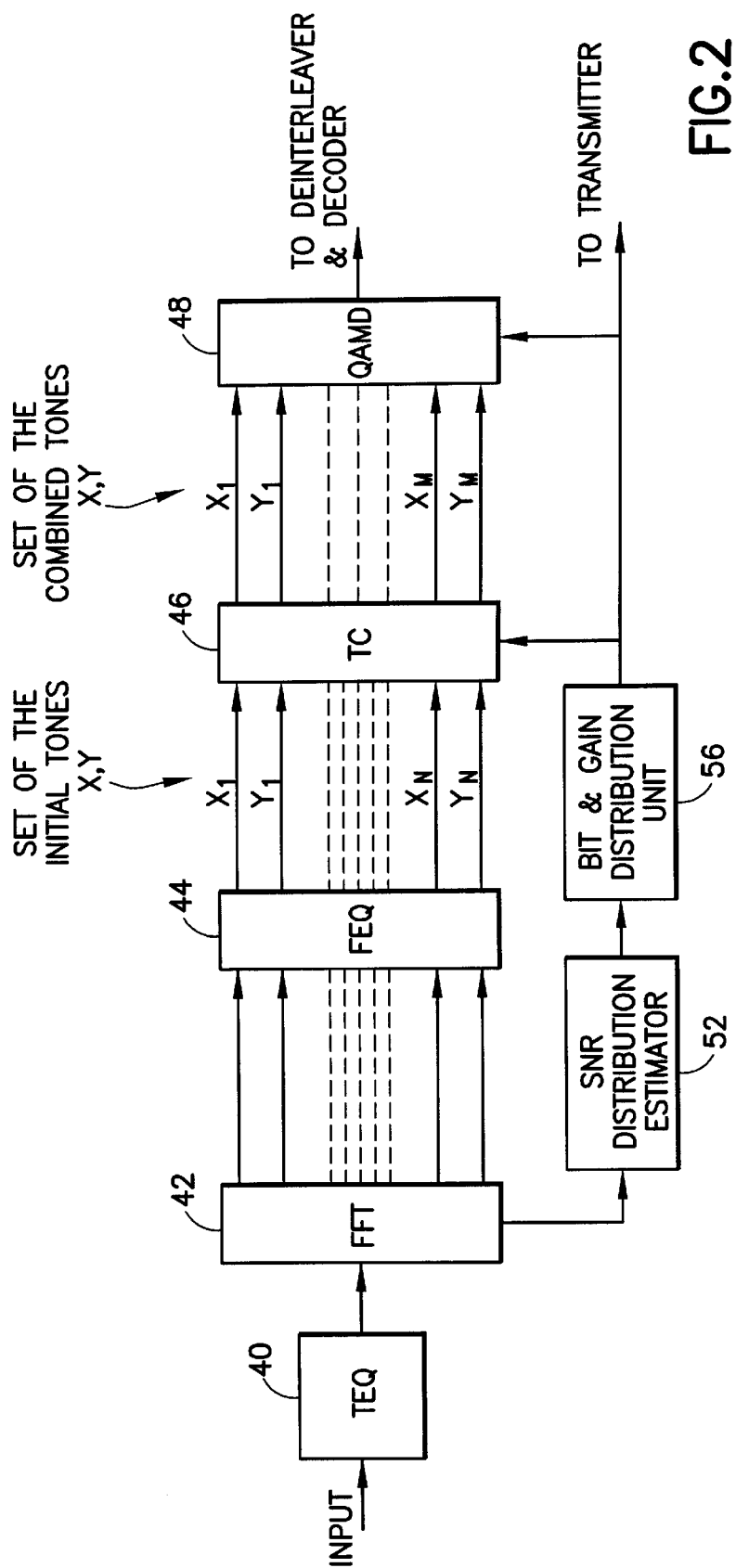
FIG. 2 is a high level block diagram of a portion of the receiver of FIG. 1.

A portion of the receiver 35 of the modems 15, 25 is seen in FIG. 2. The receiver includes conventional circuitry such as a time equalizer (TEQ) 40, a Fast Fourier Transformer (FFT) converter 42 coupled to the output of the TEQ, and a frequency equalizer 44 coupled to the output of the FFT. Generally, the time equalizer 40 eliminates intersymbol interference in the time domain. The FFT converter 42 converts the time equalized multitone signals from the time domain into the frequency domain. The frequency equalizer then adjusts the phases of all nonzero tones. As a result, a set of complex numbers $X_j$, $Y_j$ (j=1 ... N) is generated and describes a set of initially received (or "preliminary") tones in the frequency domain. According to the invention, rather than providing the set of initially received tones directly to a quadrature amplitude modulation demodulator (QAMD) 48, the set is first provided to a tone combination unit (TC) 46 for processing as described below.

As seen in FIG. 2, the output of the FFT 42 is also provided to a SNR distribution estimator 52 which estimates a signal-to-noise ratio for each tone. As will be described in detail below, the SNR distribution is provided to the bit and gain distribution unit 56. In conventional DMT DSL modem receivers, the bit and gain distribution unit 56 is implemented in a processor (typically software and hardware) which determines (during initialization) the amount of gain (G) to be added to each tone by the transmitting modem, and the number of bits (B) the tone can carry (pursuant to whichever standard is being implemented by the modem). The processor 56 typically accomplishes this by methods well known in the art. See, Chow, Peter Sienpin, "Bandwidth Optimized Digital Transmission Techniques for Spectrally Shaped Channels with Impulse Noise" Chapter 4, *University Microfilm International*, Stanford University, May 1993, The "B&G" information is provided during initialization by the transmitter of the "receiving" modem to the receiver of the "transmitting modem" so that the transmitting modem can appropriately encode data on the tones.

According to the present invention, the bit and gain distribution unit 56 determines whether any of the DMT tones which cannot otherwise be used to carry data due to a SNR which is too low, can be used to send information in parallel with another DMT tone, or whether it can be used to send information by repeating the information on the same tone over a plurality of symbols. Thus, as shown in FIG. 2, the result of this determination is provided to the tone combination unit 46 so that when actual data is received by the receiver, the set of initially received tones can be properly combined with either other tones in order to provide a final set of "combined" tones for the QAMD 48.

Using the frequency-diversity technique which is more fully described below, italicized vectors $X=[X_1 \ldots X_N]$ and $Y=[Y_1 \ldots Y_N]$ may be used to describe the real and imaginary parts of all the initially received tones received by the tone combination unit 46. Likewise, non-italicized vectors $X=[X_1 \ldots X_N]$ and $Y=[Y_1 \ldots Y_N]$ can be used to describe the real and imaginary parts of the tones output by the tone combination unit. The coherent accumulation algorithm or function applied by the tone combination unit can therefore be described by the quadrature matrix M having N columns and rows:

$$M = \begin{matrix} A_{11} & A_{12} & \cdots & A_{1N} \\ A_{21} & A_{22} & \cdots & A_{2N} \\ \cdots & \cdots & \cdots & \cdots \\ A_{N1} & A_{N2} & \cdots & A_{NN} \end{matrix}$$

where $A_{kj}$ are weight coefficients of the coherent accumulation. Examples of matrices are shown in Appendix 1 hereto. Thus, the coherent accumulation algorithm implemented by the tone accumulator may be described by X=X*M, and Y=Y*M. In other words, components of the combined tones are equal to scalar products of the corresponding vectors:

$$X_j = (X \ A_j) = \sum_{k=1}^{N} A_{kj} * X_j, \text{ and } Y_j = (Y \ A_j) = \sum_{k=1}^{N} A_{kj} * Y_j$$

The nonzero weight coefficients $A_{kj}$ are functions of tone amplitudes and the noise power spectral density (PSD) and are provided to the tone combination unit by the bit and gain distribution unit. The output of the tone combination unit are complex numbers $z_j=X_j+iY_j$ (j=1 . . . N) which are provided to the QAM demodulator. It should be appreciated that because certain tones are "combined", the number of nonzero components provided to the input of the tone combination unit may be greater than the number of nonzero components exiting the tone combination unit.

As suggested above, the combination of information carried in parallel on two or more tones or repeated on one tone over two or more symbols is used by the apparatus of the invention to increase the data rate of the DMT transmission. Specifics of how information is carried parallel according to the frequency-diversity technique or over two or more symbols according to the time-diversity technique can vary. Various examples are given below.

EXAMPLE 1

One bit of information is carried in parallel (i.e., in the same symbol) on two or more DMT tones which individually have a SNR which is too low to carry even one bit of information. For example, and referring to Table 1, the 20th and 21st tones of Table 1 cannot individually bear even one bit, because even if the tones were to be amplified by the 2.5 dB gain limit, the SNR of each of those tones would not be increased up to 11 dB. Nevertheless, tones 20 and 21 are able to bear one bit together. In particular, if the 20th tone is provided with additional gain of 0.29 dB, and the 21st tone is provided with additional gain of 1.17 dB, then $SNR_{20}=SNR_{21}=8$ dB. The coherent summation of these signals in the receiver will provide a SNR=11 dB which is sufficient for one bit transmission with a BER=$10^{-7}$. Similarly, it can be shown that if the 22nd and 23rd tones are amplified by 2.5 dB each and coherently summed, they will have an integrated SNR=11.07 dB which is sufficient for one bit transmission with a BER=$10^{-7}$. Further, if the 24th, 25th and 26th tones set forth in Table 1 are boosted by 2.5 dB and coherently summed, they will have an integrated SNR=11.27 dB, allowing the system to transmit one additional bit by providing the same information on each of those three tones. Likewise, if the 27th through 31st tones are boosted by 2.5 dB and coherently summed, they will have an integrated SNR=11.48 dB, thereby allowing the system to transmit one additional bit by providing the same information on each of those five tones. By providing identical information on other groups of two or more tones which cannot otherwise bear even one bit of information, and by amplifying those tones and coherently summing the tones in the receiver, it can be shown that eleven additional bits can be provided per DMT symbol for the situation shown in Table 1. Eleven additional bits amounts to an approximately 10% increase in data rate.

It should be appreciated that while adjacent tones are being combined, it may be possible in certain circumstances to increase the bit rate even further by boosting by 2.5 dB all tones which cannot carry one bit, and by combining two or more nonadjacent tones in an optimal manner.

EXAMPLE 2

Certain standards require that, at a minimum, two bits be carried on a single tone. Thus, two bits of information are carried in parallel on two or more DMT tones which individually have a SNR which is too low to carry two bits of information. In particular, the 16th and 17th tones can not individually bear two bits because neither can be boosted to 14 dB with a maximum permitted 2.5 dB amplification. However, together, if both tones carry the same information, the coherent sum of the signals received at the receivers will have a SNR=14.01 dB which is sufficient for two bits transmission with BER=$10^{-7}$. Similarly, the 18th and 19th tones together can carry two bits of information if the 18th tone is amplified by 1.47 dB and the 19th tone by 2.4 dB such that $SNR_{18}=SNR_{19}=11$ dB, such that the coherent sum of the SNR=14 dB. The 20th, 21st, and 22nd tones can likewise be boosted by 2.5 dB and combined to permit transmission of two more bits. An additional ten bits of data can be transmitted by amplifying and combining tones 102 and 103, tones 104 and 105, tones 106 through 108, tones 109 through 111, and tones 112 through 115. With sixteen additional bits per DMT symbol, the bit rate is increased by approximately 17%.

It should be appreciated that while adjacent tones are being combined, it may be possible in certain circumstances to increase the bit rate even further by boosting by 2.5 dB all tones which cannot carry two bits, and by combining two or more nonadjacent tones in an optimal manner.

EXAMPLE 3

A first tone which could otherwise carry two or more bits of information is "combined" with a second tone which cannot carry even one bit of information (by parallel transmission) in order to increase the bit carrying capacity of the first tone by one extra bit. For example, the 90th tone of Table 1 with SNR=20.84 can bear three bits. The 107th tone, even boosted by 2.5 dB cannot carry even one bit. However, by transmitting the same four bit combination on tones 90 and 107, an integrated SNR=21.06 is obtained which is sufficient for transmission of four bits at a BER=$10^{-7}$.

It should be appreciated that other combinations of tones can be utilized to increase the data rate, some of which require that one or both of the utilized tones be boosted by up to the maximum 2.5 dB. Further, it should be appreciated that where the standard requires at least two bits to be carried on a single tone, it may be possible to use a tone which cannot carry two bits to increase the bit carrying capacity of the first tone by two bits.

EXAMPLE 4

In some circumstances it may not be possible to obtain a further data rate increase although one or more tones which cannot carry a minimum number of bits (one or two) are unutilized. In this case, the otherwise unused tones may be combined with tones which are transmitting a minimum (or more) number of bits to increase the energy margin for that tone(s). For example, a particular tone may have a SNR=14 which is exactly what is required for the transmission of two bits with BER=$10^{-7}$. Another tone may have a SNR=8 dB. By sending the same data on the tone having a SNR=8 dB as on the tone having a SNR=14, an integrated SNR=14.97 dB can be obtained so that the margin for the tone having the SNR=14 is increased to almost 1 dB. It should be appreciated that in some circumstances, tones having an unsuitable SNR for carrying data, which could otherwise be used to increase the data rate (via combination) can nonetheless be used to increase margin as opposed to increasing data rate.

EXAMPLE 5

A tone having too low of an SNR to be used for one bit transmission is repeated with the same bit of data over two or more symbols. The tones carrying the same bit are combined coherently at the receiver to provide a sufficient SNR for the desired BER. In particular, assuming the SNR does not change during several DMT symbols, two repetitions of the same tone will provide a 3 dB gain; three repetitions a 4.78 dB gain; and four repetitions a 6 dB gain, etc. For example, the 107th tone of Table 1 cannot bear a single bit even if its SNR is increased by 2.5 dB. However, if the tone carrying a single bit is repeated, the final SNR will be 10.972 dB which is practically sufficient for the transmission of one bit with BER=$10^{-7}$ (and with a minor amount of boost can be lifted to 11 dB). Similarly, if the 111th tone is repeated three times, a SNR=11.06 dB is obtained, while if the 23rd tone is repeated four times, a SNR=11.12 dB is obtained.

EXAMPLE 6

In a system requiring a minimum of two bits to be transmitted on any tone, a tone having too low of an SNR to be used for two bit transmission is repeated with the same two bits of data over two or more symbols. The tones carrying the same bits are combined coherently at the receiver to provide a sufficient SNR for the desired BER for carrying two bits of data.

EXAMPLE 7

The concepts of any of the frequency-diversity Examples 1–4 can be combined with the concepts of either of the time-diversity Examples 5 and 6. This requires carrying the same data on two or more tones and repeating the same tones with the same data during two or more symbols. Thus, with respect to Examples 1 and 5, if two tones each having a SNR=5.0 are directed to carry the same data, and that data is repeated in a second symbol for the same two tones, a final SNR=5 dB+3 dB+3 dB=11 dB is obtained. As a result, an additional 0.5 bits per DMT symbol is transmitted.

It should be appreciated that the time-diversity technique discussed above with reference to Examples 5 and 6 has certain advantages and disadvantages relative to the frequency-diversity technique of Examples 1 through 4. In particular, a disadvantage is that it introduces an at least one-symbol delay into the signal processing. An advantage is that for several consecutive symbols, the SNR ratio for any particular tone will be close to each other, and consequently the aggregate SNR increases quickly. Another advantage is that the signaling required to indicate which tones are being utilized may be simplified as discussed below.

It will be appreciated by those skilled in the art that while the invention is primarily directed toward increasing the data rate of a DMT symbol by coherently combining multiple tones of a single symbol carrying the same information and/or the same tone of multiple symbols carrying the same information, it is still necessary for the modems of the system to communicate with each other in order to provide information as to which tones are to be combined. According to a presently preferred embodiment, the communication is accomplished by extending the B&G initialization message of the standard to include a "Bits Repetition Message" (BRM). Three different embodiments of a BRM for the frequency-diversity arrangement are seen in FIG. 3a. In particular, FIG. 3a shows a first BRM (rows one and two) which, for each tone, consists of binary indication (i.e., flag) as to whether the tone is to be combined with a previous tone, and if so, the difference between the number of the given tone and the number of the tone with which it is to be combined. Thus, for the first BRM in FIG. 3a, as shown in row one, tones one through seven are provided with a "0" flag which indicates that they are not to be combined with previous tones. Tone eight is provided with a "1" flag which indicates that it is to be combined with a previous tone. The previous tone is identified by the subsequent four bits "0001"=1, which means that eighth tone is to be combined with a previous tone which is one tone away (i.e., tone seven). It will be appreciated that with the first BRM of FIG. 3a, tones nine, ten, and eleven are to be combined, as tone ten is flagged and identifies tone nine as the tone with which it is to be combined, while tone eleven is flagged and also identifies tone nine as the tone with which it is to be combined (i.e., 0010=2, and hence the previous tone is two tones away from tone eleven). In row two, the same BRM is utilized. Tones one through six are provided with a "0" flag which indicates that they are not to be combined with any previous tone. Tone seven is provided with a "1" flag and a value of 0011=3. As such, tone seven is to be combined with tone four. As will be appreciated, according to the provided BRM, tones eight, nine, eleven and twelve are to be combined together, while tone ten is not combined with any shown tones.

According to a second BRM shown in the third row of FIG. 3a, four BRM bits are allocated to every tone without any flag bits. The four bits provide a value as to the difference between the number of the given tone and the number of a previous tone with which it is to be combined. When the value of the four bits is zero, the tone is not combined with any previous tone. As seen in the third row, tone seven has a value of three and is therefore to be combined with tone four, while tones nine, eleven and twelve are to be combined with tone eight.

It will be appreciated that in both the first and second BRMs of FIG. 3a, only four bits are provided to identify a previous tone, and hence tone combinations must be within sixteen tones of each other. Of course, if desired, the four-bit bit field can be expanded so that any tone combination can be obtained.

Where only adjacent tones will be combined, a more compact BRM can be utilized such as shown in row four of FIG. 3a. In this third BRM, a bit is set to "1" if the tone is to be combined with its adjacent previous tone. Thus, in the third BRM, tones one through seven are not combined with any previous tones. Because tone eight has a flag bit set to one, it is combined with tone seven. Tone nine is likewise not combined with any previous tone, but tones ten and eleven are combined with tone nine, as tone ten has a flag bit set to one (and is therefore to be combined with tone nine), and tone eleven has a flag bit set to one (and is therefore to be combined with tone ten which is to be combined with tone nine).

Turning to FIG. 3b, one embodiment of a BRM for a time-diversity arrangement is seen. According to the embodiment of FIG. 3b, a flag bit is provided for any tone which is to be combined with the same tone of a subsequent tone symbol. Thus, if a particular tone is to be combined over two symbols, the tone of the first symbol will have a "1" flag while the same tone representing the second symbol will have a "0" flag. Similarly, if a particular tone is to be combined over three symbols, the tone in both the first and second symbols will have a "1" flag while the same tone representing the third symbol will have a "0" flag. It is expected that tones from no more than three symbols will be combined, and thus, during the initialization, the total number of bits utilized will be three times the number of possible tones. As seen in FIG. 3b, tones seven through twelve of the first symbol (first row) are provided with a flag indicating that they are to be combined with like tones of the next symbol. Tones seven through ten of the second symbol are provided with a flag "0" indicating that they are not to be combined with like tones of the next symbol, while tones eleven and twelve are provided with a flag "1" indicating that they are to be combined with like tones of the next symbol. Thus, tones seven through ten are combined with like tones over two symbols, while tones eleven and twelve are combined with like tones over three symbols.

According to the invention, the BRM for the time-diversity arrangement can take a similar form to the BRM for the frequency-diversity arrangement. Thus, the BRM may include a plurality of bits (e.g., two bits) for each tone of a single symbol, with the bits indicating the number of symbols over which the tone is to be combined. Thus, if tone seven is to be sent over two symbols, bits "01" (i.e., one additional symbol) would be utilized, while if tone eleven was to be sent over three symbols, bits "10" (two additional symbols) would be utilized.

It will be appreciated by those skilled in the art that other bit repetition messages can be utilized, and that where both the time-diversity and frequency-diversity techniques are utilized together, a more complex BRM may be required. It should also be appreciated that the BRM need not be implemented by extending the B&M initialization message, but could be located in existing non-used bit fields of the initialization message (or elsewhere). Moreover, it should be appreciated that the non-used bit fields of the initialization message can also be utilized to signal whether the time-diversity, frequency-diversity technique, a combination of the two, or neither technique is being employed. Further, the non-used bit fields of the initialization message can be used to indicate the length of the BRM message being sent.

There have been described and illustrated herein several embodiments of methods, apparatus, and systems for increasing the data rate of DMT modems through the utilization of low-SNR tones which would otherwise not be utilized in existing systems. While particular embodiments of the invention have been described, it is not intended that the invention be limited thereto, as it is intended that the invention be as broad in scope as the art will allow and that the specification be read likewise. Thus, while particular receiver circuitry has been shown, it will be appreciated that other circuitry could be utilized. Also, while particular bit repetition message algorithms were provided, it will be appreciated that other algorithms could be used. Further, while examples were provided with respect to combining tones where a particular BER was desired, it will be appreciated that utilization of different BERs will require different minimum SNRs to be obtained. It will therefore be appreciated by those skilled in the art that yet other modifications could be made to the provided invention without deviating from its spirit and scope as so claimed.

We claim:

1. A method of transmitting data utilizing discrete multi-tone technology (DMT) from a first modem over a channel to a second modem, said DMT utilizing a plurality of tones in each symbol, said method comprising:

a) finding a first tone of said plurality of tones which can carry a predetermined minimum number of bits at a predetermined bit error rate (BER) over said channel;

b) finding a second tone of said plurality of DMT tones which cannot carry said predetermined minimum number of bits at said predetermined BER;

c) at the transmitter of the first modem, providing said second tone with identical information carried on said first tone in parallel; and d) transmitting said first and second tones over the channel.

2. A method according to claim 1, further comprising:

e) coherently combining said first and second tones of said single symbol at the receiver of the second modem.

3. A method according to claim 2, wherein:

said first tone prior to being coherently combined can carry a first number of bits at said predetermined BER, and said coherent combination of said first and second tones provides an integrated signal to noise ratio (SNR) for said first and second tones, thereby permitting said first tone to carry said first number of bits plus at least one extra bit.

4. A method according to claim 2, further comprising:

finding a third tone of said plurality of DMT tones which cannot carry said predetermined minimum number of bits at said predetermined BER;

at the transmitter of the first modem, providing said third tone with identical information carried on said first and second tones in parallel;

coherently combining said third tone with said first and second tones at the receiver of the second modem.

5. A method according to claim 4, wherein:

said first tone prior to being coherently combined can carry a first number of bits at said predetermined BER, and said coherent combination of said first, second, and third tones provides an integrated signal-to-noise ratio (SNR) for said first, second, and third tones, thereby permitting said first tone to carry said first number of bits plus at least one extra bit.

6. A method according to claim 2, wherein:

said first tone prior to being coherently combined can carry a first number of bits at said predetermined BER, and said coherent combination of said first and second tones provides an integrated signal to noise ratio (SNR) for said first and second tones, thereby permitting said first tone to carry said first number with an additional energy margin.

7. A method according to claim 1, wherein:

said predetermined minimum number of bits is one bit.

8. A method according to claim 1, wherein:

said predetermined minimum number of bits is more than one bit.

9. A method according to claim 1, further comprising:

amplifying at least one of said first and second tones by up to 2.5 dB prior to said transmitting.

10. A method according to claim 1, wherein:

said finding a first tone is accomplished at the receiver of the second modem, and said finding a second tone is accomplished at the receiver of the second modem, and said method further comprises generating a bit repetition message from said second modem to said first modem indicating that said second tone is to be provided with said identical information carried on said first tone.

11. A method according to claim 10, wherein:

said bit repetition message comprises a flag bit for each tone.

12. A method according to claim 11, wherein:

when set, said flag bit indicates that a tone is to be coherently combined with an adjacent previous tone.

13. A method according to claim 11, wherein:

said bit repetition message further comprises a plurality of tone identifying bits for each flag bit which is set, said plurality of tone identifying bits being provided with a value which identifies the distance between the tone having its flag bit set and the tone with which it is to be coherently combined.

14. A method according to claim 10, wherein:

said bit repetition message comprises a plurality of tone identifying bits for each tone of said symbol, said plurality of tone identifying bits being provided with a value which identifies the distance between the tone itself and the tone with which it is to be coherently combined.

15. A method of transmitting data utilizing discrete multitone technology (DMT) from a first modem over a channel to a second modem, said DMT utilizing a plurality of tones in each symbol, said method comprising:

a) finding at least two tones of said plurality of tones which cannot carry a predetermined minimum number of bits at a predetermined bit error rate (BER) over said channel;

b) at the transmitter, of the first modem providing each of said two tones with identical information in parallel; and c) transmitting said at least two tones over the channel.

16. A method according to claim 15, further comprising:

d) coherently combining said at least two tones in parallel at the receiver in order to provide an integrated signal-to-noise ratio (SNR) for said at least two tones, thereby permitting said at least two tones to together carry said predetermined minimum number of bits.

17. A method according to claim 15, wherein:

said predetermined minimum number of bits is one bit.

18. A method according to claim 15, wherein:

said predetermined minimum number of bits is more than one bit.

19. A method according to claim 15, wherein:

said at least two tones comprises at least three tones.

20. A method according to claim 15, further comprising:

amplifying at least one of said two tones by up to 2.5 dB prior to said transmitting.

21. A method according to claim 15, wherein:

said finding at least two tones is accomplished at the receiver of the second modem, and said method further comprises generating a bit repetition message from said second modem to said first modem indicating that said at least two tones are to be provided with said identical information.

22. A method according to claim 21, wherein:

said bit repetition message comprises a flag bit for each tone which when set indicates that a tone is to be coherently combined with an adjacent previous tone.

23. A method according to claim 21, wherein:

said bit repetition message comprises a flag bit and a plurality of tone identifying bits for each flag bit which is set, said plurality of tone identifying bits being provided with a value which identifies the distance between the tone having its flag bit set and the tone with which it is to be coherently combined.

24. A method according to claim 21, wherein:

said bit repetition message comprises a plurality of tone identifying bits for each tone of said symbol, said plurality of tone identifying bits being provided with a value which identifies the distance between the tone itself and the tone with which it is to be coherently combined.

25. A method of transmitting data utilizing discrete multitone technology (DMT) from a first modem over a channel to a second modem, said DMT utilizing a plurality of tones in each symbol, said method comprising:

a) finding a first tone of said plurality of tones which cannot carry a predetermined minimum number of bits at a predetermined bit error rate (BER) over said channel;

b) at the transmitter of the first modem, providing said first tone in each of a plurality of DMT symbols with identical information;

c) transmitting said DMT symbols over the channel.

26. A method according to claim 25, further comprising:

d) coherently combining said first tone of said plurality of DMT symbols at the receiver in order to provide an integrated signal-to-noise ratio (SNR) for said first tone, thereby permitting said first tone in at least one symbol to carry said predetermined minimum number of bits.

27. A method according to claim 25, wherein:

said predetermined minimum number of bits is one bit.

28. A method according to claim 25, wherein;

said predetermined minimum number of bits is two bits.

29. A method according to claim 25, wherein:

said plurality of DMT symbols comprises two DMT symbols.

30. A method according to claim 25, wherein:

said plurality of DMT symbols comprises at least three DMT symbols.

31. A method according to claim 25, wherein:

said finding a first tone is accomplished at the receiver of the second modem, and said method further comprises generating a bit repetition message from said second modem to said first modem indicating that said first tone is to be provided with said identical information over said plurality of DMT symbols.

32. In a modem utilizing discrete multitone technology (DMT) where DMT symbols including a plurality of tones are sent and received by the modem over a channel, the modem having a transmitter and a receiver, an improvement comprising:

means for finding a first tone of said plurality of tones which can carry a predetermined minimum number of bits at a predetermined bit error rate (BER) over the channel, and for finding a second tone of said plurality of DMT tones which cannot carry said predetermined minimum number of bits at said predetermined BER, wherein said transmitter further includes means for transmitting said first tone and said second tone with identical information in parallel in a DMT symbol.

33. In the modem according to claim 32, wherein:

said receiver includes means for coherently combining said first and second tones.

34. In a modem having a transmitter and receiver and utilizing discrete multitone technology (DMT) where DMT symbols including a plurality of tones are received by the modem from another modem over a channel, an improvement comprising:

means for finding at least two tones of said plurality of tones which cannot carry a predetermined minimum number of bits at a predetermined bit error rate, wherein said transmitter includes means for transmitting said at least two tones with identical information in a single DMT symbol.

35. In the modem according to claim 34, wherein:

said receiver includes means for coherently combining a plurality of tones of a single symbol thereby permitting said plurality of tones together to carry said predetermined minimum number of bits.

36. In a modem having a transmitter and receiver and utilizing discrete multitone technology (DMT) where DMT symbols including a plurality of tones are received by the modem from another modem over a channel, an improvement comprising:

means for finding a first tone of said plurality of tones which cannot carry a predetermined minimum number of bits at a predetermined bit error rate, wherein said transmitter includes means for transmitting said first tone with identical information in a plurality of sequential DMT symbols.

37. In the modem according to claim 36, wherein:

said receiver comprises means for coherently combining said first tone over a plurality of symbols thereby permitting said first tone of one of said plurality of symbols to carry said predetermined minimum number of bits.

* * * * *